United States Patent Office 3,009,860
Patented Nov. 21, 1961

3,009,860
ZIRCONYL TRICHLORO ALUMINATE AND METHOD OF MAKING THE SAME
Irvine W. Grote, Chattanooga, Tenn., assignor to The Chattanooga Medicine Company, Chattanooga, Tenn., a corporation of Tennessee
No Drawing. Filed June 14, 1957, Ser. No. 665,658
2 Claims. (Cl. 167—90)

The present invention is directed to a new composition of matter particularly useful as an anti-perspirant composition, and to a method of making the same.

A large number of compositions have been proposed as deodorant and perspiration retarding agents, but frequently such compositions contain free aluminum chloride or aluminum sulfate, both of which have a tendency to irritate the skin and to damage clothing. Improved aluminum compounds have also been proposed for use as anti-perspirants but these have generally proved to be unstable or too expensive.

Quite recently, it has been found that the addition of zirconium compounds have some beneficial effect when used in conjunction with aluminum compounds as anti-perspirants. However, the use of zirconium oxide or its hydrate, as such, is not satisfactory because these compounds precipitate from solution when the pH rises above 2 or 2.1. In order to maintain zirconium in solution above this pH, it has been found necessary to react the zirconium compound with a chelating agent normally consisting of an alphahydroxy or alpha amino organic acid. Such chelating agents materially increased the cost of the composition.

One of the principal objects of the present invention is to provide a water soluble compound in which zirconium is combined with aluminum, obviating the necessity of organic chelating agents.

A further object of the invention is to provide a composition particularly useful as an anti-perspirant and containing zirconium and aluminum atoms in a definite chemical compound.

A still further object of the invention is to provide a method for the synthesis of zirconyl chloro aluminates.

The composition of the present invention includes, as its active ingredient, the compound zirconyl trichloro aluminate (normally in the form of its hydrate). Said compound has the formula:

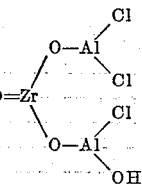

The above identified compound is produced by the reaction of zirconium oxychloride with hydrochloric acid and a source of aluminum hydroxide. The reaction with aluminum hydroxide is represented by the following equation:

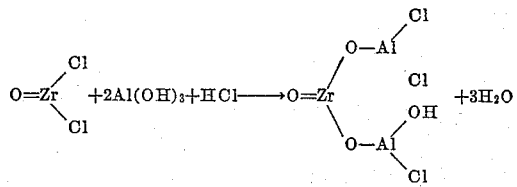

Instead of aluminum hydroxide as the initial reactant, I prefer to employ an aluminum alcoholate, in which the alcohol residue contains two to four carbon atoms, such as aluminum isopropoxide or aluminum butyl alcoholate. The reaction with aluminum isopropoxide or other alcoholate of the formula $Al(OR)_3$ apparently proceeds according to the following equation:

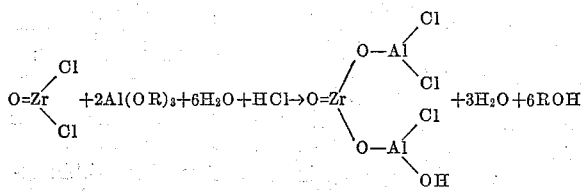

wherein R is a $C_2$—$C_4$ alkyl group.

As is well known, the aluminum trialcoholates, although relatively water insoluble, hydrolyze in a basic aqueous medium to form an aluminum hydroxide compound, that is, a compound containing at least two hydroxyl groups and either a third hydroxyl group or an alkoxy (OR) group. Any aluminum compound furnishing aluminum hydroxide under the conditions necessary to react with zirconium oxychloride to form zirconyl trichloro aluminate may be used in place of aluminum hydroxide itself.

The initial reaction results in a gel which can be substantially completely redissolved by boiling the solution. After the solution is cooled, it may be filtered to produce a relatively clear solution having a pH of about 3.5.

A further description of the invention will be made in conjunction with the following specific examples:

Example I

An amount of aluminum isopropoxide equivalent to 0.2 gram mole was added to a solution of 0.1 gram mole of hydrochloric acid in 100 ml. of water with vigorous stirring. The mixture was boiled for one minute and a solution of 0.1 gram mole of zirconium oxychloride octahydrate in 100 ml. of water was added. A gel formed immediately. The gel was boiled, with stirring, for five minutes. Nearly all of the material went into solution and the solution was then cooled, filtered, and diluted to 200 ml. The solution was clear with a slight opalescence and had a pH of 3.49. When dried in air to a glassy solid and then over calcium chloride in a vacuum desiccator for twenty-four hours, the solution was found to contain 19.08% by weight of solids.

Example II

Zirconium oxychloride octahydrate in an amount of 0.1 gram mole was dissolved in 200 ml. of water and 0.1 gram mole of hydrochloric acid was added. The solution was warmed slightly to a temperature of 35–40° C. and 0.2 gram mole of aluminum isopropoxide was added slowly with vigorous stirring. An opalescent gel formed with small lumps of white opaque material distributed throughout, which was probably aluminum hydroxide. The mixture was boiled for five minutes to dissolve the lumps and the gel became a solution. The solution was filtered hot, cooled, and then diluted to 205 ml. The cooled solution was clear with a slight opalescence, had a pH of 3.51, and gave a solids content of 18.96% by weight when dried as in Example I.

To analyze the resulting compound, a chloride analysis was performed by the Volhard titration method, and zirconium was separated from aluminum and determined by precipitation as a phosphate and ignition to the pyrophosphate. Aluminum was separated from the zirconium was sodium aluminate and was determined by the 8-hydroxy quinoline method. It was found that the mole ratios of Zr:Al:Cl in the product was 1:1.99:2.94, which corresponds closely to the theoretical ratio of 1:2:3.

To prove the existence of a definite compound, some of the material prepared according to Example I was dried in a vacuum desiccator over calcium chloride for three days and the solid thus obtained was leached with insufficient water to dissolve the material completely. The remaining solid was then dissolved and the two solutions were analyzed for aluminum, chlorine and zirconium. The following table sets forth the results obtained:

| Solution analyzed | Milligram-moles ml. | | | Mole ratio | | |
| --- | --- | --- | --- | --- | --- | --- |
| | Al | Cl | Zr | Zr: | Al: | Cl |
| Leach | 0.807 | 1.21 | 0.423 | 1 | 1.91 | 2.86 |
| Residue | 1.50 | 2.30 | 0.785 | 1 | 1.91 | 2.93 |

The results in the foregoing table show that, within experimental error, the solutions have the three elements in identical molar ratios and therefore a compound of constant composition existed.

The molecular weight of the new compound was determined in the following manner. A 25 ml. portion of the solution made by the method of Example I was dried to a glassy solid at 35 to 40° C. and was then placed in a vacuum desiccator over phosphorus pentoxide until the weight became constant. The dried material was weighed accurately, dissolved in water, and diluted to a known volume. All of the material was soluble and the temperature rose noticeably when the water was added to the solid. The solution was analyzed for the three elements and the molecular weight was calculated from each analysis and compared with an empirical formula calculated from the percentages of the elements, assuming the remainder of the compounds to be oxygen.

From this analysis, it was determined that the molar ratio of zirconium to aluminum to chlorine in the compound was 1 to 1.99 to 2.94. The average molecular weight was found to be 448, which indicated that the compound was in the form of its heptahydrate having the formula, $Al_2Cl_3HO_4Zr \cdot 7H_2O$. This compound has a molecular weight of 442.7, which is in good agreement with the calculated molecular weight of 448.

The physical properties of the new compound were compared with the physical properties of a simple mixture of aluminum chlorhydroxide and zirconium oxychloride. A 10% by weight water solution of aluminum chlorhydroxide was mixed with an equal volume of a 10% by weight solution of zirconium oxychloride. The pH of the solutions before mixing were 4.45 and 0.91, respectively. Immediately after mixing, the pH was 1.55. The mixture was divided in half and the first half portion was allowed to stand at room temperature. The pH was determined at half hour intervals for five hours, after standing over night, and at the end of 29 hours. During this time, the solution became an opalescent gel and the pH rose to 3.29. After standing for several days, the gel separated from a liquid phase.

The second half portion was boiled and cooled immediately. The solution gelled during the heating before reaching the boiling point and the gel broke up into a thick slurry. The pH of the cooled mixture was 3.11, and 29 hours after the original mixing, the pH was 3.31.

One month later, the mixture was still a gel but some syneresis had taken place.

From these tests, it was readily apparent that the physical properties of the simple mixture of aluminum chlorhydroxide and zirconium oxychloride bore very little resemblance to the physical properties of the compound produced according to the Example I and II.

The improved compounds of the present invention can be used as a liquid product, such as in water or in solution in an organic solvent at concentrations ranging from about 1 gram to 20 grams per 100 ml. of solvent. The final product may contain coloring and/or perfuming material, if desired.

The improved compound of the present invention may also be combined with a suitable cosmetic base. For example, the active ingredient may be combined with gum tragacanth, petrolatum, glyceryl monoesters such as glyceryl monolaurate, glyceryl monostearate, and the like. Generally, suitable compositions are obtained by combining from 1 to 10 parts by weight of the active ingredient with 10 parts by weight of the carrier.

It will be evident that various modifications can be made to the described embodiments without departing from the scope of the present invention.

I claim as my invention:

1. An anti-perspirant composition comprising a mixture of zirconyl trichloro aluminate having the formula

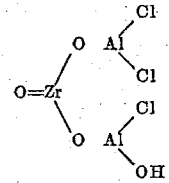

and having a pH of about 3.5 and a cosmetic base.

2. An anti-perspirant composition comprising a mixture containing from 1 to 10 parts by weight of zirconyl trichloro aluminate having the formula

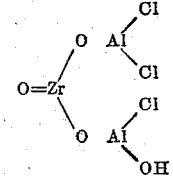

and having a pH of about 3.5 for every 10 parts of a cosmetic base.

References Cited in the file of this patent
UNITED STATES PATENTS

| 2,210,014 | Teller | Aug. 6, 1940 |
| 2,236,387 | Wallace | Mar. 25, 1941 |
| 2,413,184 | Lande | Dec. 24, 1946 |
| 2,469,413 | Roller | May 10, 1949 |
| 2,571,030 | Govett | Oct. 9, 1951 |
| 2,906,668 | Beekman | Sept. 29, 1959 |